(12) United States Patent
Zhu

(10) Patent No.: US 8,340,639 B2
(45) Date of Patent: Dec. 25, 2012

(54) MESSAGE PROCESSING SYSTEM, DEVICE AND METHOD

(75) Inventor: Xiaoying Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 327 days.

(21) Appl. No.: 12/561,453

(22) Filed: Sep. 17, 2009

(65) Prior Publication Data

US 2010/0009661 A1 Jan. 14, 2010

Related U.S. Application Data

(63) Continuation of application No. PCT/CN2008/070365, filed on Feb. 27, 2008.

(30) Foreign Application Priority Data

Mar. 20, 2007 (CN) .......................... 2007 1 0073593

(51) Int. Cl.
*H04M 1/725* (2006.01)

(52) U.S. Cl. ...................... 455/412.1; 455/415; 455/406; 455/414.1; 455/466; 455/418; 379/142.15; 709/246; 709/203

(58) Field of Classification Search ............... 455/412.1, 455/418, 433, 415, 406, 414.1, 466; 379/142.15; 709/246, 203
See application file for complete search history.

(56) References Cited

U.S. PATENT DOCUMENTS

| | | | |
|---|---|---|---|
| 6,553,110 B1 | 4/2003 | Peng | |
| 2003/0063735 A1 | 4/2003 | Brockenbrough et al. | |
| 2004/0218743 A1 | 11/2004 | Hussain et al. | |
| 2005/0047561 A1 | 3/2005 | Seiferth | |
| 2006/0166646 A1* | 7/2006 | Roach, Jr. | 455/411 |
| 2006/0281447 A1* | 12/2006 | Lewis et al. | 455/418 |
| 2010/0009661 A1 | 1/2010 | Zhu | |

FOREIGN PATENT DOCUMENTS

| | | |
|---|---|---|
| CN | 1404288 A | 3/2003 |
| CN | 1529975 | 9/2004 |
| CN | 1588967 A | 3/2005 |
| CN | 1750670 | 3/2006 |
| CN | 1874546 A | 12/2006 |
| CN | 1882110 A | 12/2006 |
| CN | 101031102 A | 5/2007 |

(Continued)

OTHER PUBLICATIONS

Chen Xing, CN1874546(A), Dec. 6, 2006, Method for controlling display of calling number in short message, abstract (p. 1).*

(Continued)

*Primary Examiner* — Joseph Arevalo

(74) *Attorney, Agent, or Firm* — Brinks Hofer Gilson & Lione

(57) ABSTRACT

A message processing system includes message center and user subscription data center. The subscription data center stores user subscription data of calling number anonymity service. The message center queries if calling number is anonymous when it transfers message that is transmitted by subscription user, and determines if calling number is anonymous in process of transfer message based on query respond. Interest and mystery of message are increased, personality demand of user is satisfied, and load of message center is decreased. Flexibility and scalability are improved. Additional, the present invention discloses a user subscription data center, a short message center and message processing method.

13 Claims, 3 Drawing Sheets

FOREIGN PATENT DOCUMENTS

| | | |
|---|---|---|
| EP | 0984608 A2 | 3/2000 |
| EP | 2124460 A1 | 11/2009 |
| WO | 01/26391 A1 | 4/2001 |
| WO | 2006060069 A2 | 6/2006 |
| WO | 2006079070 A2 | 7/2006 |
| WO | WO 2008113276 A1 | 9/2008 |

OTHER PUBLICATIONS

Written Opinion of the International Searching Authority issued in corresponding PCT Patent Application No. PCT/CN2008/070365, mailed Jun. 5, 2008.

Office Action issued in corresponding Chinese Patent Application No. 200710073593.4, mailed Jun. 27, 2008.

Office Action issued in corresponding Chinese Patent Application No. 200710073593.4, mailed Apr. 10, 2009.

Office Action issued in corresponding Chinese Patent Application No. 200710073593.4, mailed Aug. 21, 2009.

Office Action issued in corresponding Indonesian Patent Application No. W-00200902642, mailed Sep. 8, 2010.

Global Systems for Mobile Communications, "Digital Cellular Telecommunications System (Phase 2+); Mobile Application Part (MAP) Specification (GSM 09.02 Version 6.2.0 Release 1997)", ETSI. TS 100 974 v6.2.0, Nov. 1998.

Office Action issued in corresponding European Patent Application No. 08715101.5, mailed Dec. 1, 2011.

\* cited by examiner

8,340,639 B2

MESSAGE PROCESSING SYSTEM, DEVICE AND METHOD

CROSS REFERENCE TO RELATED APPLICATIONS

This application is a continuation of International Patent Application No. PCT/CN2008/070365, filed on Feb. 27, 2008, which claims priority to Chinese Patent Application No. 200710073593.4, filed on Mar. 20, 2007, both of which are incorporated by reference herein in their entireties.

FIELD OF THE INVENTION

The present invention relates to the communication field and in particular to a message processing system, device and method.

BACKGROUND OF THE INVENTION

As mobile communication network technologies develop and mobile terminals become popular, personalized services are increasingly prevalent. Especially for those fans of network chatting and making friends and those fashion pursuers, personalized communication services and service experiences become a predominant communication option of such mobile phone subscribers. Hiding of a calling number in a voice service of mobile communication is a personalized service emerging to satisfy a personalized requirement of a subscriber and to add a mysterious element; this service refers to a service in which the calling number is not shown to a callee when a caller calls the callee. Hiding of the calling number is at a higher priority than showing of the calling number, so that in the case that the calling subscriber has registered for the calling number hiding service, the calling number will not be shown to the callee even if the callee has registered for a calling number showing service.

Along with data services with rapid development, various data services implemented on a mobile terminal over a mobile communication network have become closely related to daily life of people and especially the short message service has become one of common contact manners for most of mobile communication subscribers. Therefore, there is a need of developing better personalized services for the short message service.

SUMMARY OF THE INVENTION

Embodiments of the invention provide a message processing system, device and method which can hide a calling number in a message service.

An embodiment of the invention provides a message processing system including:

a message center adapted to query about whether to hide a calling number when forwarding a message sent from a subscriber of a message calling number hiding service in accordance with a service identifier which is set for the subscriber, and to determine whether to hide the calling number when forwarding the short message in accordance with a received query message response; and a user subscription data center adapted to store subscription data of the subscriber, to receive the query message sent from the message center and to return to the message center the query message response about whether to hide the calling number in accordance with the subscription data of the subscriber sending the message.

An embodiment of the invention provides a subscription data center including:

a first storage unit adapted to store subscription data of a subscriber of a message calling number hiding service;

a receiving unit adapted to receive a query message to query about whether to hide a calling number when forwarding a message from the subscriber;

a generating unit adapted to query about the stored subscription data of the subscriber sending the message in response to the query message and to generate a query message response containing an indication of whether to hide the calling number; and a sending unit adapted to send the query message response.

An embodiment of the invention provides a short message center including:

a short message processing unit adapted to send a query message to a subscription data center upon determining a calling number hiding service identifier which is set for a source terminal sending a short message and to determine whether to hide a calling number when forwarding the short message to a destination terminal in accordance with a query message response.

An embodiment of the invention further provides a short message processing method including:

querying, by a message center, a subscription data center about whether to hide a calling number when forwarding a message sent from a subscriber of a message calling number hiding service in accordance with a service identifier which is set for the subscriber;

receiving a query message response containing whether to hide information of the calling number, which is returned from the subscription data center in accordance with subscription data of the subscriber sending the message; and determining whether to hide the calling number when forwarding the message in accordance with the query message response.

The embodiments of the invention store in the subscription data center the subscription data of the subscribers of the message calling number hiding service and set corresponding service identifiers for the respective subscribers in the message center, and the subscription data includes a calling number hiding policy which is set by the subscriber. The message center can query the subscription data center about whether to hide a calling number in accordance with the service identifier corresponding to the subscriber before forwarding a message sent from the subscriber, the subscription data center determines whether to hide the calling number in accordance with the subscription data of the subscriber and returns a corresponding message response to the message center, and the message center finally determines whether to hide the calling number in accordance with the message response, thereby satisfying a personalized demand of message subscribers.

DETAILED DESCRIPTION OF THE INVENTION

Since hiding of a calling number is currently applied only in a voice service and can not be implemented in a short message service, the embodiments of the invention propose an idea that a dedicated subscription data center is arranged in building of a network, which is adapted to store subscription data of respective subscribers of a short message calling number hiding service; when a short message subscriber registers for the calling number hiding service, a Business and Operation Support System (BOSS) sends subscription data which is added during the registration of the service for the subscriber to the subscription data center, and the subscription data center adds and stores the subscription data of the subscriber and notifies a Short Message Center (SMC) that the subscriber has subscribed for the calling number hiding service; and the short message center sets a corresponding service identifier for the subscriber and triggers a processing flow of the calling number hiding service in accordance with the service identifier, where the subscriber can also update the subscription data stored on the subscription data center through the BOSS and cancel the subscription for the service through the BOSS. The above idea may be applied to other types of messages by those skilled in the art without any inventive effort and will be described in details below with reference to the drawings and the embodiments in an example of processing a short message.

Figure 1:
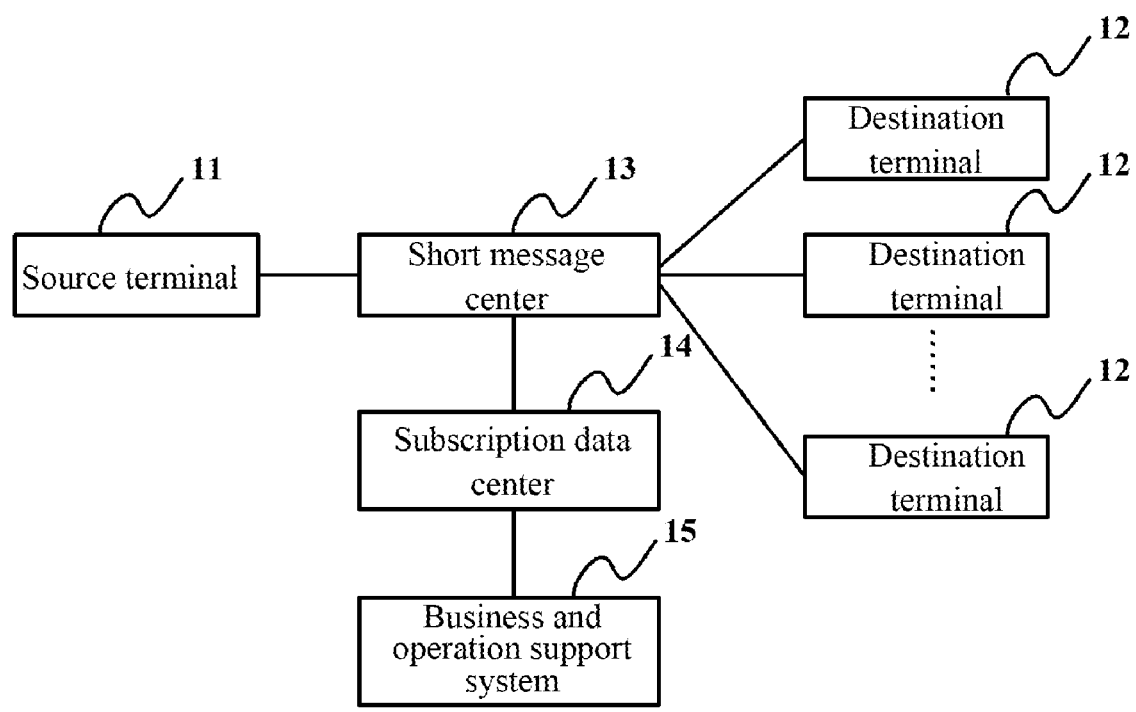
FIG. 1 is a schematic diagram of a structure of the short message processing system according to an embodiment of the invention.

FIG. 1 is a schematic diagram of the short message processing system according to an embodiment of the invention, where it is assumed that a source terminal registers for a calling number hiding service and subscription data of the source terminal is stored on a short message subscription data center. As illustrated in FIG. 1, the system includes:

at least one source terminal 11, at least one destination terminal 12, a short message center 13 and a subscription data center 14, where:

The short message center 13 connected respectively with the source terminal 11, the at least one destination terminal 12 and the subscription data center 14 is adapted to forward a short message sent from the source terminal 11 to the destination terminal 12 but firstly send a query message to the subscription data center 14 if a corresponding service identifier is determined to have been set for the source terminal.

The subscription data center 14 receives the query message sent from the short message center 13, determines whether to hide a calling number in accordance with the subscription data of the source terminal, and returns to the short message center 13 a query message response instructing the short message center 13 about whether to hide the number of the source terminal 11 in the short message sent to the destination terminal 12.

The short message center 13 determines whether to hide the number of the source terminal 11 in the short message sent to the destination terminal 12 in accordance with the query message response returned from the subscription data center 14.

The subscription data of a subscriber of the short message calling number hiding service can be stored in the short message center 13 or another network element, e.g., a Home Location Register (HLR). Practically, the short message center and the subscription data center can be arranged separately or integrally.

Figure 2:
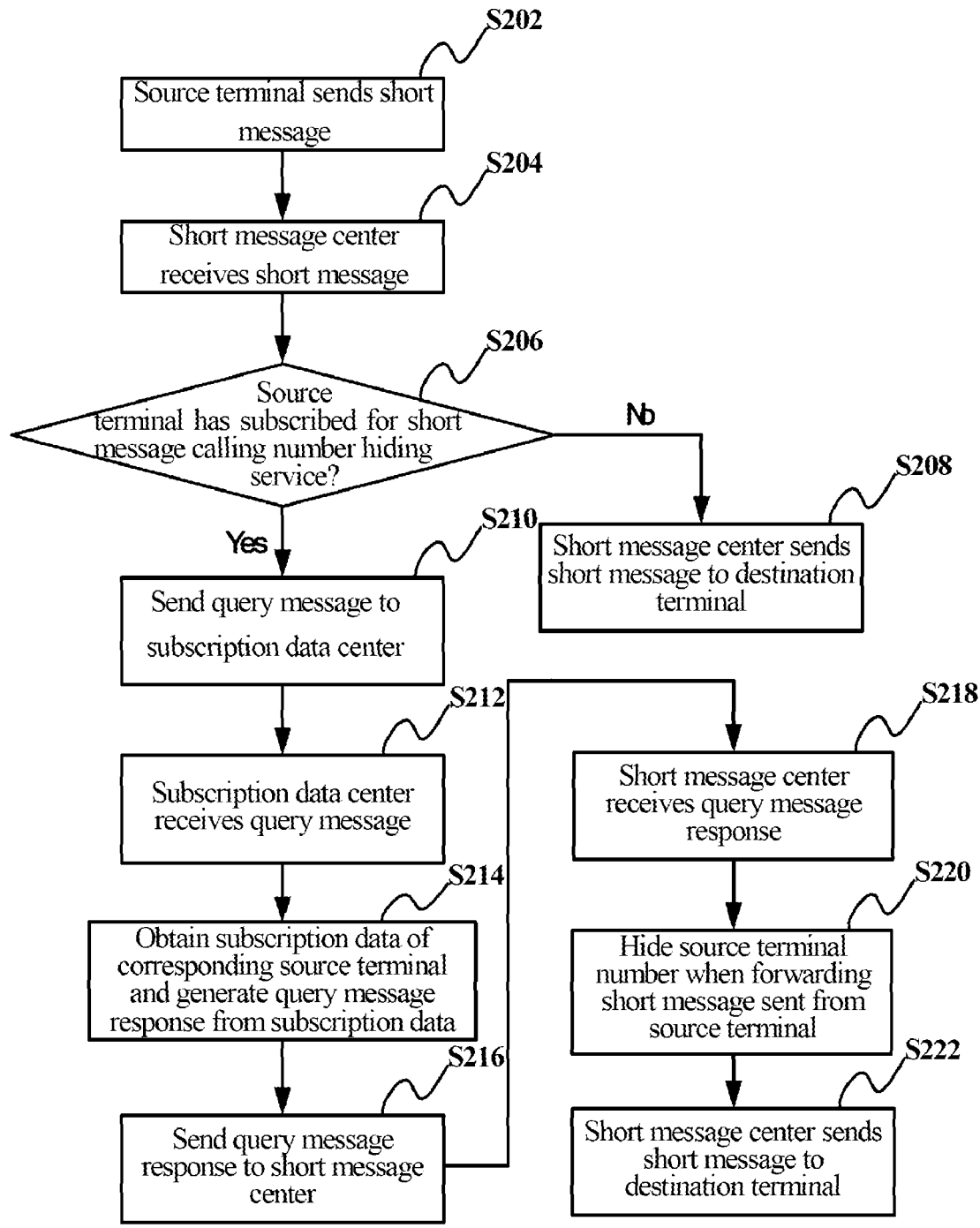
FIG. 2 is a schematic diagram of a short message processing flow according to an embodiment of the invention.

The solution according to an embodiment of the invention will be described in details with reference to FIG. 2 by way of an example that the subscription data of the subscriber of the short message calling number hiding service is stored in the short message center 13. As illustrated in FIG. 2, the following steps are involved.

In the step S202, the source terminal 11 sends to the destination terminal 12 a short message submitted to the short message center 13.

In the step S204, the short message center 13 receives the short message.

The short message center 13 has stored a service identifier which is set for the subscriber of the short message calling number hiding service.

In the step S206, the short message center 13 determines whether the source terminal 11 has subscribed for the short message calling number hiding service, and if the short message center 13 has stored the service identifier of the source terminal 11, that is, the source terminal 11 has subscribed for the short message calling number hiding service, then the short message center executes the step S210 or the step S208 otherwise.

In the step S208, the short message center 13 sends the short message to the destination terminal without hiding the number of the source terminal 11 in the short message sent to the destination terminal 12.

In the step S210, the short message center 13 sends a query message to the subscription data center 14.

The query message is to query about whether to hide the number of the source terminal 11 in the short message sent to the destination terminal 12.

In the step S212, the subscription data center 14 receives the query message.

In the step S214, the subscription data of the corresponding source terminal 11 is obtained and a query message response is generated according to the subscription data.

The subscription data center 14 has stored the subscription data of the subscriber of the short message calling number hiding service, and thus the query message sent from the short message center 13 to the subscription data center 14 includes the number identifier of the source terminal 11; and upon receiving the query message, the subscription data center 14 obtains the subscription data of the corresponding source terminal 11 in accordance with the number identifier of the source terminal 11 and generates the query message response according to the subscription data of the corresponding source terminal 11.

Preferably, the subscription data of the subscriber of the short message calling number hiding service can include the number identifier of the short message destination terminal for which the calling number is set by the subscriber to be hidden and further include calling number hiding periods which are set by the subscriber for different short message destination terminals, respectively. For example:

| Subscriber | Destination terminal for transmission of short message | Calling number hiding period |
|---|---|---|
| 123******** | 234******** | 08:00~18:00 |
|  | 256******** | 08:00~24:00 |
|  | 456******** | 12:00~18:00 |
|  | ... | ... |
| 321******** | 368******** | 10:00~22:00 |
|  | 389******** | 09:00~18:00 |
|  | 864******** | 18:00~09:00 |
|  | ... | ... |
| ... | ... | ... |

Thus, the query message sent from the short message center 13 to the subscription data center 14 further includes the number identifier of the destination terminal 12 and the period in which the source terminal 11 sends the short message.

Upon receiving the query message, the subscription data center 14 obtains the calling number hiding period which is set for the destination terminal 12 by the source terminal 11 in accordance with the number identifiers of the source terminal 11 and the destination terminal 12 in the query message, and generates the query message response carrying a calling number hiding identifier if the time when the source terminal 11 sends the short message falls within the calling number hiding period which is set for the destination terminal 12; otherwise the subscription data center generates the query message response carrying a calling number non-hiding identifier.

In the step S216, the subscription data center 14 sends the query message response to the short message center 13.

In the step S218, the short message center 13 receives the query message response.

In the step S220, it is determined whether to hide the number of the source terminal 11 upon forwarding the short message sent from the source terminal 11 to the destination terminal 12.

Upon receiving the query message response, the short message center 13 hides the number of the source terminal 11 in the short message sent to the destination terminal 12 if the query message response carries the calling number hiding identifier or does not hide the number of the source terminal 11 in the short message sent to the destination terminal 12 if the query message response carries the calling number non-hiding identifier.

Preferably, hiding the number of the source terminal 11 in the short message sent to the destination terminal 12 includes setting a calling number field in the short message sent to the destination terminal 12 as a null or specific field (e.g., 00000000000).

In the step S222, the short message center sends the short message to the destination terminal 12.

Those ordinarily skilled in the art can appreciate that all or part of the steps in the above method according to the embodiment can be implemented by a program instructing relevant hardware, which can be stored in a computer readable medium, e.g., an ROM/RAM, a magnetic disk, an optical disk, and so on.

The solution according to an embodiment of the invention will be further described below in a specific example to facilitate understanding thereof.

It is assumed that a source terminal with a number of 12300000001 has subscribed for the calling number hiding service and the subscription data of the subscriber stored in the subscription data center 14 is as follows.

| Subscriber | Destination terminal for transmission of short message | Calling number hiding period |
|---|---|---|
| 12300000001 | 12300000002 | 08:00~18:00 |
|  | 12300000003 | 08:00~24:00 |
|  | 12300000004 | 12:00~18:00 |
|  | ... | ... |
| 32100000001 | 32100000002 | 10:00~22:00 |
|  | 32100000003 | 09:00~18:00 |
|  | 32100000004 | 18:00~09:00 |
|  | ... | ... |
| ... | ... | ... |

It is assumed that the source terminal with the number of 12300000001 sends to a destination terminal with a number of 12300000002 at 09:30 a short message submitted to the short message center, and the short message center determines that the source terminal of 12300000001 has subscribed for the calling number hiding service and sends to the subscription data center a query message including the number 12300000001 of the source terminal, the number 12300000002 of the destination terminal and the time of 09:30 when the short message is sent. Upon receiving the query message, the subscription data center obtains from the subscription data of the subscriber the calling number hiding period of 08:00~18:00, which is set by the source terminal for the destination terminal of 12300000002, in accordance with the number 12300000001 of the source terminal and the number 12300000002 of the destination terminal; and since the time of 09:30 when the short message is sent falls within the calling number hiding period of 08:00~18:00, the subscription data center generates a query message response carrying a calling number hiding identifier for the destination terminal of 12300000002 and sends to the short message center the query message response which may include the following contents:

| Field of source terminal number | Field of destination terminal number | Identifier field |
|---|---|---|
| 12300000001 | 12300000002 | 1 |

Where the identifier field of 1 indicates the calling number hiding identifier and correspondingly, the identifier field of 0 indicates a calling number un-hiding identifier.

Since the identifier field for the destination terminal of 12300000002 in the query message response indicates 1, i.e., the calling number hiding identifier, the short message center hides the number of the source terminal (12300000001) in the short message sent to the destination terminal of 12300000002 upon receiving the query message response. Specifically, a calling number field in the short message sent to the destination terminal of 12300000002 is set as a null or specific field (e.g., 00000000000).

Further in the above embodiment, if the subscription data of the subscriber stored in the subscription data center includes no calling number hiding period which is set by the source terminal for any destination terminal, then a calling number hiding period 00:00~24:00 (i.e., hidden all day long) or 00:00~00:00 (i.e., unhidden all day long) of the source terminal for the destination terminal can be determined by default.

The calling number hiding service can also be implemented when the source terminal sends a short message to a group of numbers (a plurality of destination terminals), which will be described in the following embodiments.

It is assumed that a source terminal with a number of 12300000001 has subscribed for the calling number hiding service and the subscription data of the subscriber stored in the subscription data center 14 is as follows.

| Subscriber | Destination terminal for transmission of short message | Calling number hiding period |
|---|---|---|
| 12300000001 | 12300000002 | 08:00~18:00 |
|  | 12300000003 | 08:00~24:00 |

| Subscriber | Destination terminal for transmission of short message | Calling number hiding period |
|---|---|---|
| 32100000001 | 12300000004 | 12:00~18:00 |
| | ... | ... |
| | 32100000002 | 10:00~22:00 |
| | 32100000003 | 09:00~18:00 |
| | 32100000004 | 18:00~09:00 |
| | ... | ... |
| ... | ... | ... |

It is assumed that the source terminal of 12300000001 sends to a plurality of destination terminals (with number of 12300000002, 12300000003 and 12300000004, respectively) at 09:30 a short message submitted to the short message center, and the short message center identifies that the source terminal has subscribed for the calling number hiding service and sends to the subscription data center a query message including the number 12300000001 of the source terminal, the numbers 12300000002, 12300000003 and 12300000004 of the destination terminals and the time of 09:30 when the short message is sent. Upon receiving the query message, the subscription data center respectively obtains from the subscription data center the calling number hiding periods of 08:00~18:00, 08:00~24:00 and 12:00~18:00 of the source terminal for the destination terminals of 12300000002, 12300000003 and 12300000004, in accordance with the number 12300000001 of the source terminal and the numbers 12300000002, 12300000003 and 12300000004 of the destination terminals, and since the time of 09:30 when the short message is sent falls within the calling number hiding periods of 08:00~18:00 and 08:00~24:00 but not within the calling number hiding period of 12:00~18:00, the subscription data center generates and sends to the short message center a query message response which carries calling number hiding identifiers for the destination terminals of 12300000002 and 12300000003 and a calling number non-hiding identifier for the destination terminal of 12300000004 and which may include the following contents:

| Field of source terminal number | Field 1 of destination terminal number | Identifier field 1 | Field 2 of destination terminal number | Identifier field 2 | Field 3 of destination terminal number | Identifier field 3 |
|---|---|---|---|---|---|---|
| 12300000001 | 12300000002 | 1 | 12300000003 | 1 | 12300000004 | 0 |

Where the identifier field of 1 indicates the calling number hiding identifier and the identifier field of 0 indicates the calling number un-hiding identifier.

Since the identifier fields for the destination terminals of 12300000002 and 12300000003 in the query message response indicate 1, i.e., the calling number hiding identifier, the short message center hides the number 12300000001 of the source terminal in the short message sent to the destination terminals of 12300000002 and 12300000003 upon receiving the query message response. Specifically, a calling number field in the short message sent to the destination terminals of 12300000002 and 12300000003 is set as a null or specific field (e.g., 00000000000). Since the identifier fields for the destination terminal of 12300000004 in the query message response indicate 0, i.e., the calling number non-hiding identifier, the short message center does not hide the number of the source terminal (12300000001) in the short message sent to the destination terminal of 12300000004.

In the above embodiment, if the subscription data of the subscriber stored in the subscription data center includes no calling number hiding period which is set by the source terminal for any destination terminal, then a calling number hiding period 00:00~24:00 (i.e., hidden all day long) or 00:00~00:00 (i.e., unhidden all day long) of the source terminal for the destination terminals can be determined by default.

Referring back to FIG. 1, the short message processing system according to the embodiment of the invention can further include a business and operation support system 15 adapted to receive a service registration request or a service update request from the subscriber and to send subscription data added during the service registration of the subscriber or send subscription data updated during the service update of the subscriber to the subscription data center 14.

The subscriber data center 14 adds and stores the subscription data added during the service registration of the subscriber and notifies the short message center that the subscriber has subscribed for the calling number hiding service, or updates and stores the subscription data updated during the service update of the subscriber.

In the embodiment of the invention, when the subscriber who has subscribed for the short message calling number hiding service sends a short message to the destination terminal, the short message is submitted to the short message center, and the short message center receives the short message and sends the short message to the destination terminal by setting the calling number field in the short message as a null or specific field, so that the calling number can be hidden in the short message to add interesting and mysterious elements of the short message and to secure information privacy of the subscriber. The subscriber can also set the subscription data of the subscriber through the business and operation support system in a way that different calling number hiding policies are set for different destination terminals to implement the calling number hiding service. For example, different calling number hiding periods are set for different destination terminals so that the subscriber may or may not hide the calling number in the short message for the different destination terminals in different periods, thereby satisfying a personalized demand of the subscriber. The subscriber may set such subscription data to realize that the user will not hide the calling number when sending a short message to his family or friend but will show his official phone number when sending a short message to his customer for business. The dedicated subscription data center is set during networking to store the subscription data of the subscriber, and the subscriber can also add or update the subscription data of the subscriber in the subscription data center through the business and operation support system, so that the burden over the short message center can be reduced and the flexibility and extendibility of the system can be improved.

Figure 3:
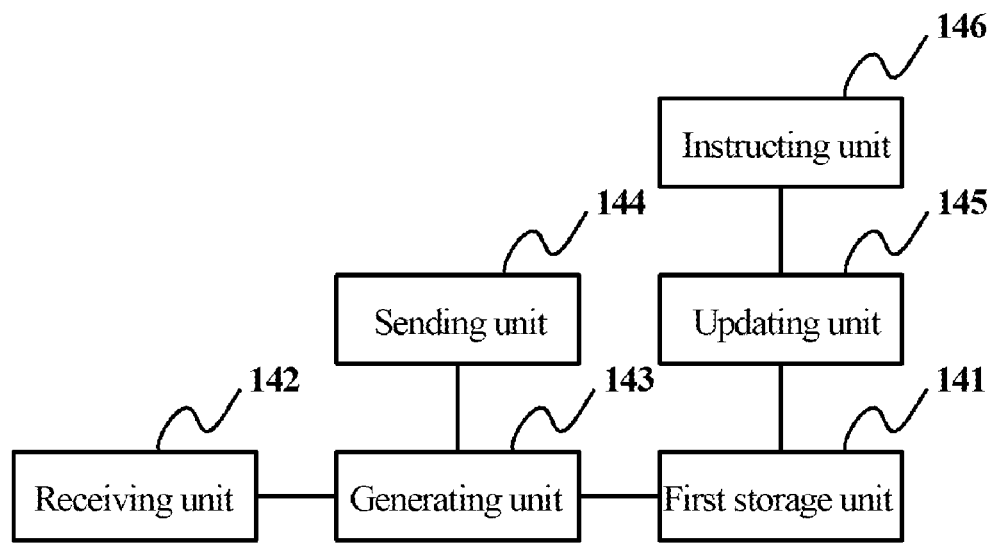
FIG. 3 is a schematic diagram of a stricture of the subscription data center according to an embodiment of the invention.

A specific structure of the subscription data center 14 as illustrated in FIG. 3 also with reference to FIG. 1 includes the following units.

A first storage unit 141 is adapted to store subscription data of respective subscribers of the short message calling number hiding service.

A receiving unit 142 is adapted to receive a query message sent from the short message center 13, which is to query about whether to hide a calling number when forwarding a short message from a subscriber.

A generating unit 143 is adapted to query about the stored subscription data of the subscriber sending the short message in response to the query message and to generate a query message response containing an indication of whether to hide the calling number.

A sending unit 144 is adapted to send the query message response to the short message center 13.

Figure 4:
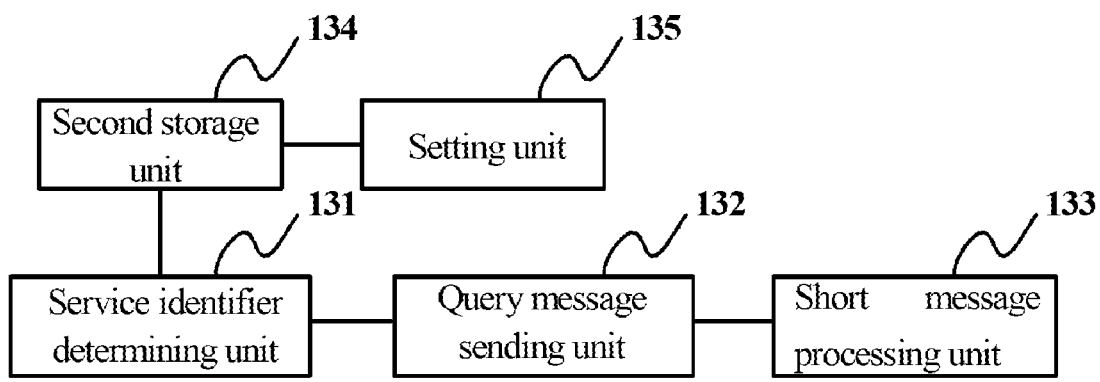
FIG. 4 is a schematic diagram of the short message center according to an embodiment of the invention.

A specific structure of the short message center 13 as illustrated in FIG. 4 also with reference to FIG. 1 and FIG. 3 includes the following units.

A service identifier determining unit 131 is adapted to determine that a calling number hiding service identifier is set for a source terminal sending a short message.

A query message sending unit 132 is adapted to send a query message to the subscription data center 14 in accordance with the calling number hiding service identifier and to receive a query message response returned from the subscriber data center.

A short message processing unit 133 is adapted to determine whether to hide a calling number when forwarding the short message to the destination terminal 12 in accordance with the query message response received by the query message sending unit 132.

Further, the short message center 13 may also include a second storage unit 134 adapted to store service identifiers which are set for respective subscribers of the short message calling number hiding service. The service identifier determining unit 131 queries the second storage unit 134 in accordance with the calling number of the source terminal sending the short message and determines the calling number hiding service identifier which is set for the source terminal sending the short message.

In order to accomplish service interaction with the business and operation support system 15, the subscription data center 14 according to the embodiment of the invention in FIG. 3 further includes the following units.

An updating unit 145 is adapted to receive the subscription data of the respective subscribers of the short message calling number hiding service and to add or update the subscription data into the first storage unit 141.

An instructing unit 146 is adapted to instruct the short message center 13 to set the service identifier for the new subscriber of the short message calling number hiding service.

In FIG. 4, the short message center 13 according to the embodiment of the invention further includes the following units.

A setting unit 135 is adapted to receive the instruction sent from the instructing unit 146 of the subscriber data center 14 and to set in the second storage unit 134 the service identifier for the new subscriber of the short message calling number hiding service in response to the instruction.

Practically, the subscriber can further cancel the subscription for the service, by deleting the subscription data of the subscriber and instructing the short message center to cancel the service identifier of the subscriber through the business and operation support system.

In the embodiments of the invention, the subscription data of the subscriber of the short message calling number hiding service is stored in the first storage unit 141 of the subscription data center 14, thereby enabling the subscriber to perform advanced setting of the calling number hiding service while reducing the burden over the short message center 13 and improving the extendibility of the system; the generating unit generates the query message response from the subscription data of the subscriber stored in the first storage unit 141, thereby implementing the calling number hiding service in the calling number hiding policy which is set by the subscriber; the service identifier determining unit 131 of the short message center 13 determines whether the service identifier is set for the source terminal sending the short message, thereby authenticating the subscriber while restricting a query directed to the subscription data center 14 and reducing the calculation workload of the system; the short message processing unit 133 determines whether to hide the calling number when forwarding the short message to the destination terminal 12 in accordance with the query message response received by the query message sending unit 132, thereby implementing the calling number hiding service while securing information privacy of the subscriber and adding interesting and mysterious elements of the short message; and the updating unit 145 receives the subscription data of the respective subscribers of the calling number hiding service and adds or updates the subscription data into the first storage unit 141, thereby improving the flexibility of the system.

Those skilled in the art can modify the specific structures of the short message center and the subscription data center dependent upon a specifically designed flow in any way known to those skilled in the art, descriptions of which will not be repeated here.

To summarize, a calling number can be hidden when sending a short message in a way that subscription data of a subscriber is stored in the subscriber data center and the short message center queries the subscription data center about a calling number hiding policy which is set by the subscriber.

Evidently, those skilled in the art can modify and vary the invention without departing from the spirit and scope of the invention. Accordingly, the invention is intended to encompass these modifications and variations thereof provided that they come into the scope of the claims appended to the invention and their equivalents.

What is claimed is:

1. A message processing system, which comprises:
   a message center adapted to:
   determine, after receiving a message sent from a source terminal, whether a service identifier of the source terminal has been stored for the source terminal,
   query a subscription data center about whether to hide a calling number of the source terminal if the message center has stored the service identifier
   determine whether to hide the calling number in the message when forwarding the message to a destination terminal in accordance with a received query message response received from a subscription data center, and to hide the calling number when forwarding the message to the destination terminal, if the received query message response carries a calling number hiding identifier, otherwise, forward the message to the destination terminal without hiding the calling number, if the received query message response carries a calling number non-hiding identifier; and
   wherein the user subscription data center is adapted to:
   store subscription data of the source terminal, receive the query message sent from the message center, and return the query message response to the message center, wherein the query message response comprising whether to hide the calling number in accordance with the subscription data of the source terminal;

the subscription data of the source terminal comprises a hiding period that is set by the source terminal for the short message destination terminal for which the calling number is hidden.

2. The system according to claim 1, further comprises a business and operation support system, wherein:

the business and operation support system is adapted to receive subscription data of a subscriber of a message calling number hiding service or subscription data updated by a subscriber, and to send the subscription data to the subscription data center; and the subscription data center is adapted to instruct the message center to set the service identifier for the subscriber of the message calling number hiding service.

3. The system according to claim 1, where the message center and the subscription data center are arranged separately or integrally.

4. The system according to claim 3, wherein the message is a short message and the message center is a short message center.

5. A short message center, comprising:

a service identifier determining unit adapted to determine, after receiving a short message sent from a source terminal, whether a calling number hiding service identifier is being set for the source terminal sending a short message;

a query message sending unit adapted to send a query message to a subscription data center in accordance with the calling number hiding service identifier if the calling number hiding service identifier is being set for the source terminal and to receive a query message response returned from the subscription subscriber data center; and a short message processing unit adapted to determine whether to hide a calling number in the short message from the source terminal, when forwarding the short message to a destination terminal in accordance with the query message response comprising whether to hide the calling number, and to hide the calling number, when forwarding the short message to the destination terminal if the query message response carries the calling number hiding identifier, and forward the short message to the destination terminal without hiding the calling number if the query message response carries a calling number non-hiding identifier;

the subscription data of the source terminal comprises a hiding period that is set by the source terminal for the short message destination terminal for which the calling number is hidden.

6. The short message center according to claim 5, further comprises a second storage unit adapted to store the calling number hiding service identifier which is being set for the source terminal;

the service identifier determining unit is adapted to query the second storage unit in accordance with the calling number, and to determine the calling number hiding service identifier which is being set for the source terminal.

7. The short message center according to claim 6, further comprises:

a setting unit adapted to receive an instruction from the subscription data center, and in response to the received instruction, add in the second storage unit the service identifier for a subscriber of a short message calling number hiding service.

8. A message processing method, comprising:

determining, by a message center, after receiving a message sent from a source terminal, whether a service identifier is stored for the source terminal;

querying, by a message center, a subscription data center about whether to hide a calling number of the source terminal if the message center has stored the service identifier of the source terminal when forwarding a message sent from a receiving, by the message center, a query message response comprising whether to hide information of the calling number, which is returned from the subscription data center in accordance with subscription data of the source terminal subscriber sending the message; and determining, by the message center, whether to hide the calling number in the message when forwarding the message to a destination terminal in accordance with the query message response; and if the query message response carries a calling number hiding identifier, hiding, by the message center, the calling number of the source terminal in the message when sending the message to the destination terminal, otherwise, sending the message to the destination terminal without hiding the calling number of the source terminal in the message if the query message response carries calling number non-hiding identifier;

the subscription data of the source terminal comprises a hiding period that is set by the source terminal for the short message destination terminal for which the calling number is hidden.

9. The method according to claim 8, further comprising:

sending by a service and operation support system, subscription data of a subscriber of a message calling number hiding service or subscription data updated by the subscriber to the subscription data center; and receiving and storing by the subscription data center, the subscription data of the subscriber of the message calling number hiding service, and instructing the message center to set the service identifier for the subscriber of the message calling number hiding service.

10. The method according to claim 8, wherein the message is a short message and the message center is a short message center.

11. The method according to claim 10, wherein:

the subscription data of the subscriber comprises a number identifier of a short message destination terminal for which the calling number is set by the source terminal to be hidden; and the query message comprises the number identifier of a short message destination terminal, and the subscription data center determines whether to hide the calling number in the short message when forwarding the short message from the source terminal to the destination terminal in accordance with the number identifier of the destination terminal.

12. A message processing method, comprising:

determining, by a message center, after receiving a message sent from a source terminal, whether a service identifier is stored for the source terminal;

querying, by a message center, a subscription data center about whether to hide a calling number of the source terminal if the message center has stored the service identifier of the source terminal;

receiving, by the message center, a query message response comprising whether to hide information of the calling number, which is returned from the subscription data center in accordance with subscription data of the source terminal; and determining, by the message center, whether to hide the calling number in the message when forwarding the message to a destination terminal in accordance with the query message response, wherein:

the message is a short message and the message center is a short message center:

the subscription data of the subscriber comprises a number identifier of a short message destination terminal for which the calling number is set by the source terminal to be hidden;

the query message comprises the number identifier of a short message destination terminal, and the subscription data center determines whether to hide the calling number in the short message when forwarding the short message from the source terminal to the destination terminal in accordance with the number identifier of the destination terminal;

the subscription data of the source terminal comprises a hiding period that is set by the source terminal for the short message destination terminal for which the calling number is hidden; and the query message further includes a time when the short message is sent, and the subscription data center further queries the hiding period in accordance with the number identifier of the destination terminal and determines whether to hide the calling number when forwarding the short message from the source terminal to the destination terminal in accordance with a match relationship between the time when the short message is sent and the hiding period.

13. A non-transitory computer readable medium, comprising computer program codes stored thereon, executable by one or more digital processor, wherein the computer program codes comprise:

instructions for sending, by a service and operation support system, subscription data of a subscriber of a message calling number hiding service or subscription data updated by the subscriber to a subscription data center;

instructions for receiving and storing, by the subscription data center, the subscription data of the subscriber of the message calling number hiding service, and instructing a message center to set a service identifier for the subscriber of the message calling number hiding service;

instructions for determining, by the message center, after receiving a message sent from a source terminal, whether the service identifier is stored for the source terminal;

instructions for querying, by the message center, the subscription data center about whether to hide the calling number if the message center has stored the service identifier of the source terminal;

instructions for receiving, by the message center, a query message response comprising whether to hide information of the calling number, which wherein the query message response is returned from the subscription data center in accordance with the subscription data of the source terminal; instructions for determining, by the message center, whether to hide the calling number in the message when forwarding the message to a destination terminal in accordance with the received query message response;

instructions for hiding, by the message center, the calling number of the source terminal in the message when sending the message to the destination terminal if the received query message response carries a calling number hiding identifier, otherwise, sending the message to the destination terminal without hiding the calling number of the source terminal in the message, if the received query message response carries a calling number non-hiding identifier;

the subscription data of the source terminal comprises a hiding period that is set by the source terminal for the short message destination terminal for which the calling number is hidden.

* * * * *